(12) United States Patent
Shibata et al.

(10) Patent No.: US 10,655,730 B2
(45) Date of Patent: May 19, 2020

(54) VEHICLE AND ACCESSORY CONTROL SYSTEM

(71) Applicant: Honda Motor Co., Ltd., Tokyo (JP)

(72) Inventors: Hidehiko Shibata, Kokubunji (JP); Yusuke Funayose, Higashimurayama (JP)

(73) Assignee: Honda Motor Co., Ltd., Tokyo (JP)

( * ) Notice: Subject to any disclaimer, the term of this patent is extended or adjusted under 35 U.S.C. 154(b) by 35 days.

(21) Appl. No.: 16/037,370

(22) Filed: Jul. 17, 2018

(65) Prior Publication Data

US 2018/0320781 A1 Nov. 8, 2018

Related U.S. Application Data

(63) Continuation of application No. 15/406,914, filed on Jan. 16, 2017, now Pat. No. 10,054,218.

(51) Int. Cl.
| | | |
|---|---|---|
| *F16H 59/00* | (2006.01) | |
| *F16H 59/02* | (2006.01) | |
| *B60K 20/06* | (2006.01) | |
| *B60K 37/06* | (2006.01) | |
| *B60Q 1/14* | (2006.01) | |
| *B60K 20/08* | (2006.01) | |
| *B60Q 1/00* | (2006.01) | |
| *F16H 59/04* | (2006.01) | |

(52) U.S. Cl.
CPC ......... *F16H 59/0217* (2013.01); *B60K 20/06* (2013.01); *B60K 20/08* (2013.01); *B60K 37/06* (2013.01); *B60Q 1/0076* (2013.01); *B60Q 1/1469* (2013.01); *F16H 59/02* (2013.01); *B60K 2370/12* (2019.05); *F16H 59/044* (2013.01); *F16H 2059/0247* (2013.01)

(58) Field of Classification Search
CPC .............. F16H 59/0217; F16H 59/044; F16H 2059/0247; B60Q 1/0076; B60K 20/06; B60K 37/06
USPC .................... 74/473.3, 473.31, 552; 180/336
See application file for complete search history.

(56) References Cited

U.S. PATENT DOCUMENTS

| | | |
|---|---|---|
| 2012/0221200 A1 | 8/2012 | Golomb |
| 2014/0116179 A1 | 5/2014 | Sata |
| 2016/0152137 A1 | 6/2016 | Sunahiro |
| 2016/0276118 A1 | 9/2016 | Srbinovski |
| 2017/0023127 A1 | 1/2017 | Greasamar et al. |

FOREIGN PATENT DOCUMENTS

JP 2008-302927 A 12/2008

*Primary Examiner* — Victor L MacArthur
(74) *Attorney, Agent, or Firm* — Honda Patents & Technologies North America, LLC; Clifford B Vaterlaus

(57) ABSTRACT

A control system for a vehicle, such as an off-road recreational vehicle, that includes a powertrain and an accessory. The control system includes an actuator, such as a paddle shifter, configured to operate in a powertrain mode to control an aspect of the powertrain, and to operate in an accessory mode to control an aspect of the accessory. The control system also includes a selector configured to switch the actuator between the powertrain mode and the accessory mode.

20 Claims, 3 Drawing Sheets

VEHICLE AND ACCESSORY CONTROL SYSTEM

RELATED APPLICATIONS

This application is a continuation of U.S. patent application Ser. No. 15/406,914 filed Jan. 16, 2017, the disclosure of which is incorporated herein by reference in its entirety.

BACKGROUND

The disclosed subject matter relates to vehicle and accessory controls. More particularly, the disclosed subject matter relates to a system for controlling certain vehicle features, including but not limited to features that relate to operation of the powertrain and features that relate to vehicle accessories.

Vehicles may be configured to satisfy or achieve a variety of performance capabilities and may have controls and associated structures tailored to suit anticipated usages. For example, some vehicles may be configured for primary off-road use, or for utility or recreational purposes. Some such vehicles may provide a relatively open seating area for the vehicle operator and/or other occupants. Various accessories may be provided for enhancing the off-road experience or assisting in achieving work or recreational activities. The addition of some accessories may increase the complexity of operation of the vehicle and may make access to the accessory controls less convenient. Moreover, additional accessory controls may sometimes unduly increase the number of parts and the cost of the accessories.

SUMMARY

In accordance with one embodiment of the present disclosure, a control system is provided for a vehicle. The vehicle may include a powertrain and an accessory. The control system may include an actuator configured to operate in a powertrain mode to control an aspect of the powertrain, and to operate in an accessory mode to control an aspect of the accessory. The control system may also include a selector configured to switch the actuator between the powertrain mode and the accessory mode.

In accordance with another embodiment of the present disclosure, a control system is provided for use with a vehicle having a steering wheel that is configured to enable vehicle steering, the vehicle including a powertrain and an accessory. The control system may include a paddle shifter configured to be disposed adjacent the steering wheel to enable actuation while one of the vehicle operator's hands grasps the steering wheel. The paddle shifter may be configured to operate in a powertrain mode to control an aspect of the powertrain, and to operate in an accessory mode to control an aspect of the accessory. The control system may also include a selector configured to switch between the powertrain mode and the accessory mode.

In accordance with yet a further embodiment of the present disclosure, a vehicle control system comprises a powertrain for powering the vehicle. The vehicle control system may also include an accessory for use with the vehicle and an actuator configured to operate in a powertrain mode to control an aspect of the powertrain, and to operate in an accessory mode to control an aspect of the accessory. The vehicle control system may further include a selector configured to switch the actuator between the powertrain mode and the accessory mode.

BRIEF DESCRIPTION OF THE DRAWINGS

Certain embodiments of the present disclosure will be better understood from the following description taken in conjunction with the accompanying drawings in which.

DETAILED DESCRIPTION OF EXEMPLARY EMBODIMENTS

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows. Embodiments are hereinafter described in detail in connection with the views and examples of FIGS. 1-5, wherein like numbers indicate the same or corresponding elements throughout the views.

Figure 1:
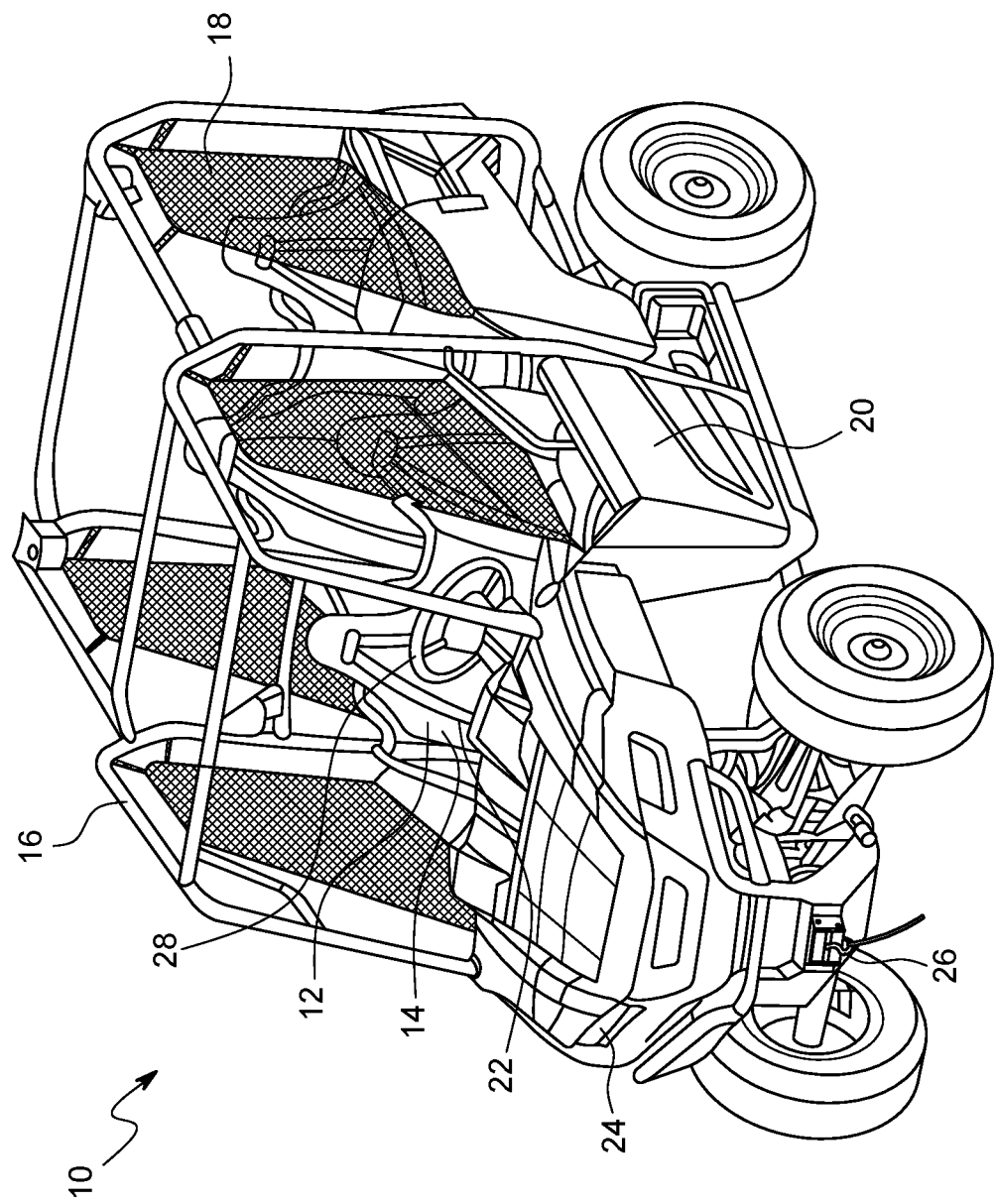
FIG. 1 is a front perspective view depicting a vehicle with an accessory in accordance with one embodiment of the present disclosure.

FIG. 1 illustrates a vehicle 10 in accordance with one embodiment of the present disclosure, which is shown to comprise an off-road vehicle. However, vehicles in accordance with alternative embodiments can comprise any variety of vehicles, including automobiles, trucks, vans, recreational vehicles, utility vehicles, agricultural equipment, or construction equipment, for example.

The vehicle 10 may include one or more seats 12 for occupants of the vehicle 10. It will be appreciated that the seats 12 may be arranged in any manner and may include bench seats or bucket seats. The seats 12 may be arranged in a side by side configuration, and may be arranged in a single row or multiple rows within the scope of the present disclosure.

The vehicle 10 may include an occupant space 14 surrounded by roll bars 16, nets 18 and/or doors 20. The vehicle 10 may also include seat belts 22 in any known configuration, including lap belts, shoulder belts, multi-point restraints or harnesses. The seat belts 22 may be attached to the seat 12, the roll bars 16 or any suitable anchor point on the vehicle 10.

The vehicle 10 may have a variety of accessories. For example, the vehicle 10 may include headlights 24 and/or a winch 26 as described in greater detail below. The vehicle 10 may also include other accessories not shown in FIG. 1, such as audio devices (including horns, radios, music or entertainment systems, or the like), auxiliary lights, windshield wipers, heaters, etc. The vehicle 10 may also include a steering wheel 28 for steering the vehicle 10 in a manner known to those skilled in the art.

Figure 2:
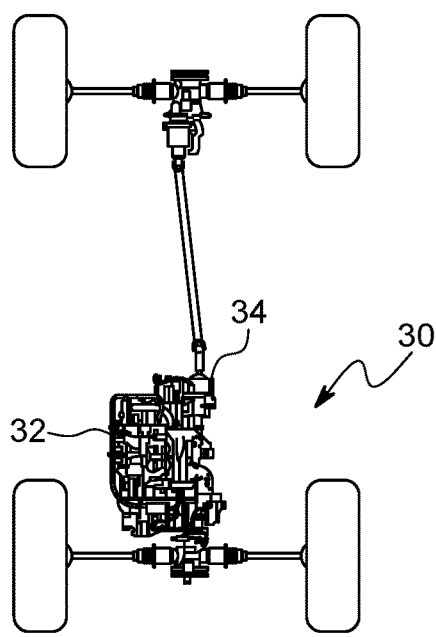
FIG. 2 is a top view of one embodiment of a powertrain useful with the concepts of the present disclosure.

As shown in FIG. 2, the vehicle 10 may include a powertrain, indicated generally at 30, including a power source 32 for powering the vehicle 10. The power source 32 may include an internal combustion engine, an electric motor, or a hybrid of an internal combustion engine and an electric motor that can provide a motive power to the vehicle 10. The power source 32 may be located in any suitable location in the vehicle 10, including a front portion, a-mid portion or a rear portion of the vehicle 10.

The powertrain 30 may also include a transmission 34, that may include, but not be limited to, a multi-ratio gear transmission, a hydraulic-type transmission, a hydrostatic-type transmission, a belt-drive transmission (e.g., a continuously-variable transmission), or any of a variety or other suitable transmission arrangements. The transmission 34 may be configured to selectively or alternatively operate in a variety of different gears, such as reverse, first gear, second gear, third gear, fourth gear, fifth gear, etc. Also, embodiments of the vehicle 10 may be configured to selectively and alternatively operate in a two-wheel drive mode or a four-wheel drive mode.

Figure 3:
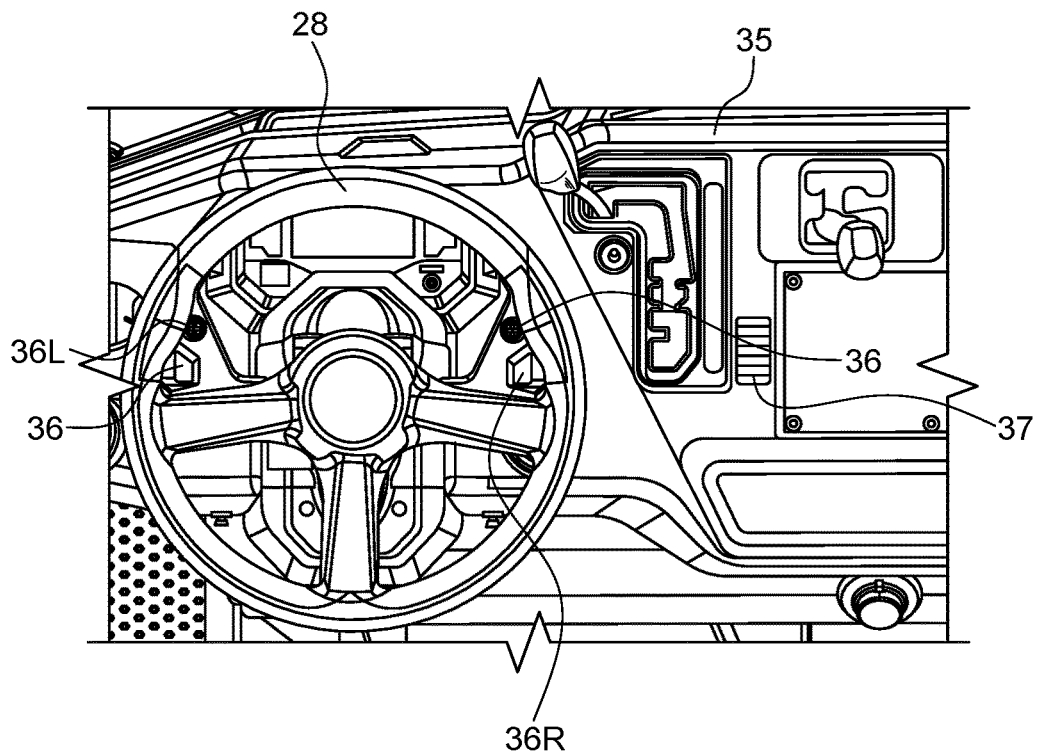
FIG. 3 is a view of a portion a dash board and controls of a vehicle facing a rear of the vehicle as viewed by a driver in accordance with one embodiment of the present disclosure.

Referring now to FIG. 3, which depicts a view of a portion of a dashboard 35 of the vehicle 10 facing a rear of the vehicle 10 as viewed by a driver. The vehicle 10 may include paddle shifters or actuators 36. The actuators 36 may be located on opposite sides of the steering wheel 28 in a manner such that a driver can operate the actuators 36 while grasping the steering wheel 28. In one embodiment, the actuators may be configured to shift gears in the transmission 34. For example, the actuators 36 may include a first actuator 36R disposed on a right side of the steering wheel 28, and a second actuator 36L disposed on a left side of the steering wheel 28. The first actuator 36R may be positioned for actuation by a driver's right hand while grasping the steering wheel 28, whereas the second actuator 36L may be positioned for actuation by the driver's left hand while grasping the steering wheel 28. In one embodiment, actuation of the first actuator 36R may cause the transmission 34 to shift to a higher gear, whereas actuation of the second actuator 36L may cause the transmission 34 to shift to a lower gear.

A selector 37 may be provided for allowing a driver to select between a plurality of modes, as discussed more fully below. The selector 37 may be positioned on the dash board 35 at a position within convenient reach of the driver. Alternatively, the selector 37 may be positioned on the steering wheel 28 or any other suitable location. The selector 37 may be configured as a lever, dial or other switching device for being moved to a plurality of positions to select a desired mode.

Figure 4:
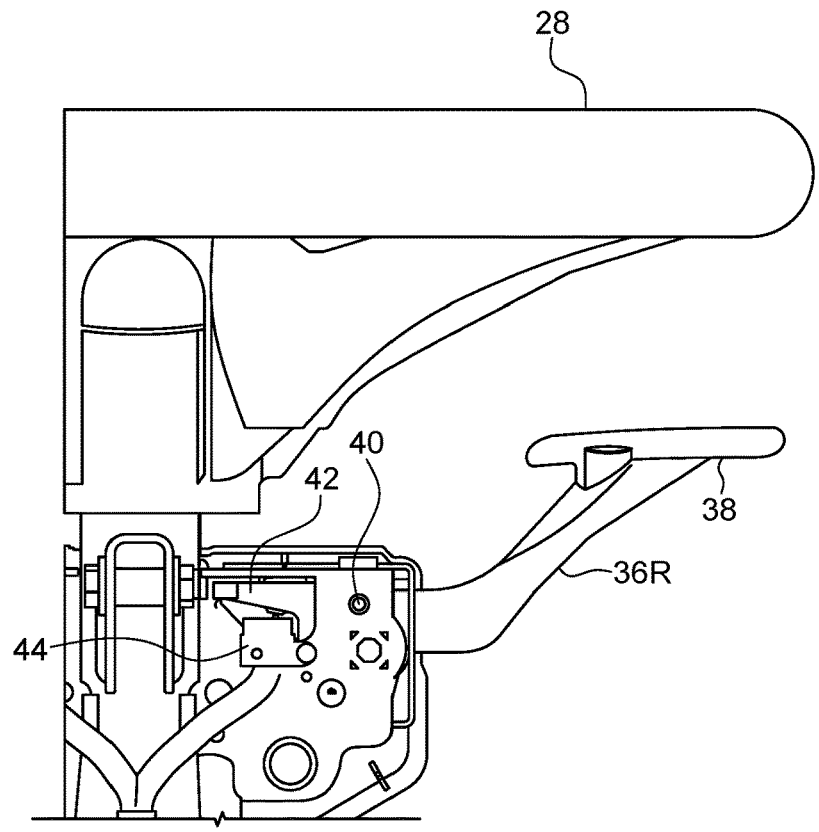
FIG. 4 is bottom view of one embodiment of an actuator.

Referring to FIG. 4, a bottom view of the first actuator 36R is shown. It will be appreciated that the second actuator 36L may be configured in a similar manner, and the description below will refer to the actuators 36 in general, such that the description applies to both the first actuator 36R and the second actuator 36L. The actuator 36 may include a contact portion 38 for being contacted by the driver's hand to pull the actuator 36. The actuator 36 may be attached to the vehicle 10 through a pivot 40 such that the actuator 36 is configured to move about the pivot 40 when pulled by the driver. The actuator 36 may include an end portion 42 opposite the contact portion 38 for operating a switch 44. The switch 44 may be formed as a leaf lever or any other suitable mechanism to electrically interact with an electrical circuit or system, as described in greater detail below with respect to FIG. 5. It will be understood that a spring or the switch 44 may provide a biasing force against the end portion 42 of the actuator 36 to maintain the actuator 36 in a released position when the contact portion 38 is not pulled by the driver.

Figure 5:
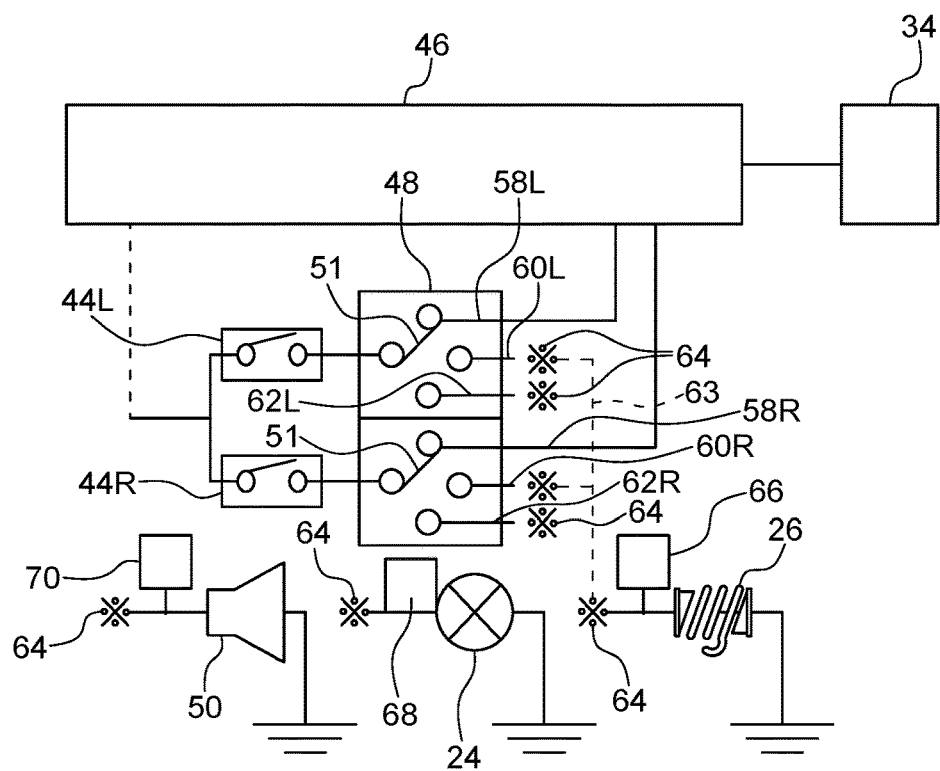
FIG. 5 is a schematic electronic diagram useful in one embodiment of the present disclosure.

Referring now to FIG. 5, a schematic diagram is shown depicting an exemplary control system for use with the actuators 36. The vehicle 10 may include a controller 46 for receiving, manipulating and sending signals for operating various features of the vehicle 10. Although not shown in detail in the drawings, the controller 46 or ECU may have a general configuration known to those skilled in the art, including a central processing unit (CPU), a read-only memory (ROM), a random access memory (RAM), a backup RAM, and the like, and may be connected to other components, such that necessary information or signals can be transmitted/received to/from each other in a bidirectional manner. The controller 46 may have various programs for operation control of the components.

In one embodiment, the controller 46 may be operatively connected to the transmission 34 and to the actuators 36 such that operation of the right or first actuator 36R may cause the transmission to shift to a higher gear, whereas operation of the left or second actuator 36L may cause the transmission to shift to a lower gear. In one embodiment, if both the right actuator 36R and the left actuator 36L are operated at the same time, the controller 46 may be configured such that no shifting may occur. The controller 46 may also be configured to operate the transmission 34 in an automatic mode to shift gears automatically without the need to manipulate the actuators 36.

With further reference to FIG. 5, a right or first switch 44R may be associated with the first actuator 36R, and a left or second switch 44L may be associated with the second actuator 36L. A selector circuit 48 is depicted corresponding to the selector 37. As shown by the selector circuit 48, the selector 37 may be adjustable to a plurality of different modes. For example, the selector 37 may select between a powertrain mode in which the actuators 36 can be operated to shift gears as discussed above. The selector 37 may also be placed in one or more accessory modes so that the actuators 36 may be manipulated to operate one or more accessories. For example, the accessory modes may include a winch mode for operating the winch 26, a headlight mode for operating the headlights 24, or an audio mode for operating an audio device 50. It will be understood that the audio device 50 is shown schematically in FIG. 5, and the audio device 50 depicted may represent a horn, a radio, or any other device for emitting sound. It will also be understood that any other number of accessories may be used in connection with the present disclosure, such as auxiliary lights, windshield wipers, heaters, and the like.

To accomplish the selection of different modes, the selector circuit 48 may include a mechanism for switching amongst a plurality of paths. For example, the selector circuit 48 may include a selector element 51 corresponding to each of the first switch 44R for the first actuator 36R, and the second switch 44L for the second actuator 36L. Both of the selector elements 51 may move in unison so that the first actuator 36R and the second actuator 36L may be switched to different modes at the same time.

The selector circuit 48 may include a first path 58R, 58L for connecting the actuators 36 to the controller 46 for operating in a powertrain mode to shift gears in the transmission 34. It will be understood that the selector circuit 48 may have a first path 58R corresponding to the first switch 44R for the first actuator 36R, and a first path 58L corresponding to the second switch 44L and the second actuator 36L. Accordingly, the selector circuit 48 has two separate elements designating the first path (58R and 58L) in FIG. 5.

Thus, the selector elements 51 may be used to connect the first path 58R, 58L to the actuators 36 in the powertrain mode.

The selector circuit 48 may also include a second path 60R, 60L and a third path 62R, 62L. It will be understood that any desired number of such paths may be provided for attaching accessories to the actuators 36. In the embodiment shown in FIG. 5, the second path 60R, 60L may be for connecting the actuators to a winch 26, as shown by the dashed line indicated at 63. Similarly, the third path 62R, 62L may be connected to the headlights 24 or the audio system 50. It will be understood that any number of paths to any number of accessories may be used, and the arrangement of the paths may be determined as desired within the scope of the present disclosure. Accordingly, as shown in FIG. 5, the accessories including the winch 26, headlights 24, and audio device 50 could be interchanged in the second path 60R, 60L and the third path 62R, 62L as shown by the symbol indicated at 64.

For illustrative purposes, a further discussion of an accessory in the form of the winch 26 will now be provided. The winch 26 may be disposed at any suitable location on the vehicle 10, such as a front central portion of the vehicle 10. In alternative embodiments, the winch 26 may be disposed in other areas of the vehicle 10. The winch 26 may include a motor for rotating a reel to extend and retract a cable. The winch 26 may also include a winch control circuit 66, as part of or separate from the controller 46, to operate in a forward rotational direction to wind the cable, or a reverse rotational direction to unwind the cable. The winch control circuit 66 may allow for control of the winch, including an on-off mechanism, and mechanisms to control the direction of the winch 26. In one embodiment, the winch 26 may be operated by the winch control circuit 66 independently of the actuators 36. Accordingly, it will be understood that the selector circuit 48 may be connected to the winch 26 in parallel with the winch control circuit 66 such that the winch 26 may be controlled by either the actuators 36 through the selector circuit 48, or by separate controls associated with the winch control circuit 66.

The selector 37 may be positioned in the winch mode in which the selector circuit 48 positions the selector elements 51 in the second path 60R, 60L so that the winch 26 can be operated using the actuators 36. In one embodiment, when the first actuator 36R is actuated, the winch 26 may be operated to turn the reel such that the cable extends. Movement of the reel may continue while the first actuator 36R is actuated. Once the first actuator 36R is released, movement of the reel may stop. Actuation of the second actuator 36L may cause the reel to rotate in a reverse direction, causing the cable to wind around the reel causing the cable to retract. It will be appreciated that alternative embodiments may be used in which the function of the first actuator 36R and the second actuator 36L are reversed, i.e. operation of the first actuator 36R causes the cable to retract, and operation of the second actuator 36L causes the cable to extend.

As discussed above according to one embodiment, when the first actuator 36R or the second actuator 36L are held in a retracted position, the winch 26 may continue to operate while in the winch mode. In other words, the actuators 36 may have a continuous function. In contrast, when the system is in the powertrain mode, holding one of the actuators 36 in the retracted position may cause a momentary action causing the transmission 34 to shift only one gear. Accordingly, it will be noted that the operational function of the actuators 36 may be different in different modes. It will also be understood that additional features may be included in the controller 46 or a circuit of the winch 26 which may cause operation of the winch 46 to function as desired, such as to stop once the cable has been extended or retracted a pre-determined amount, for example.

Use of the actuators 36 to operate the winch 26 may allow for convenient operation of the winch 26 while the driver's hands are resting on the steering wheel 28. Moreover, additional parts are not necessary to allow operation of the winch 26, which can reduce the cost and complexity of the winch system in some embodiments. Also, one embodiment of the actuators 36 and winch 26 arranged in accordance with the present disclosure may be particularly convenient for operation of a snow plow (not shown) attached on the vehicle 10.

It will be understood that various other accessories can be operated in a similar manner. For example, in a light mode, the headlights 24 may be operated using the actuators 36. The first actuator 36R or the second actuator 36L may be used to turn on the headlights 24 and the other of the actuators 36 may be used to turn off the headlights 24. Alternatively, one or both of the actuators 36 may be used to switch the headlights between high and low beam modes of operation. A light circuit 68 may be provided to operate the headlights 24 using a customary manner, such as switches on the steering wheel 28 or dashboard 35, so that the actuators 36 may be attached in parallel with the light circuit 68.

In another embodiment, the actuators 36 may be used to operate an audio device 50, such as a horn. An audio circuit 70 may be provided to operate the audio device 50 in a customary manner. In the audio device mode, operation of one or both the actuators may cause the horn to sound. The sound may continue while the actuators 36 are pulled. Once the actuators are released, the horn may turn off. Alternatively, the actuators 36 may be operatively connected to an audio device 50, such as a radio, entertainment system, or the like, in which either an on-off operation may be accomplished with the actuators 36, or the volume may be adjusted with the actuators 36. For example, operation of one of the actuators 36 may cause the volume to increase, whereas operation of the other actuator 36 may cause the volume to decrease.

Other embodiments of the present disclosure may be arranged in which engine output modes may be changed with the actuators 36. For example, the selector 37 may be placed in an accessory mode in which the actuators 36 may be configured to change between an economy mode, a normal mode or a sport mode. In the economy mode, the engine output, clutch and/or transmission may be configured to operate in a manner to enhance fuel economy. In contrast, the sport mode may be configured to enhance the performance of the vehicle 10. Similarly, it will be understood that various different functions may be accomplished and various different accessories may be operated using the actuators 36 in various different modes.

The foregoing description of embodiments and examples has been presented for purposes of illustration and description. It is not intended to be exhaustive or to limit the invention to the forms described. Numerous modifications are possible in light of the above teachings. Some of those modifications have been discussed and others will be understood by those skilled in the art. The embodiments were chosen and described in order to best illustrate certain principles and various embodiments as are suited to the particular use contemplated. The scope of the invention is, of course, not limited to the examples or embodiments set forth herein, but can be employed in any number of applications and equivalent devices by those of ordinary skill in the art. Rather it is hereby intended the scope of the invention be defined by the claims appended hereto.

What is claimed is:

1. A control system for a vehicle comprising:
   a powertrain for powering the vehicle;
   an accessory for use with the vehicle;
   an actuator configured to operate in a powertrain mode to control an aspect of the powertrain, and to operate in an accessory mode to control an aspect of the accessory, the actuator comprising a first lever on one side of a steering wheel, and a second lever on an opposite side of the steering wheel; and
   a selector configured to switch the actuator between the powertrain mode and the accessory mode;
   wherein when the vehicle is in the accessory mode, actuation of the first lever causes a first operation of the accessory, and actuation of the second lever causes a second operation of the accessory, wherein the first operation and the second operation are different such that actuation of the first lever causes a different operation of the accessory than actuation of the second lever.

2. The control system of claim 1, wherein the accessory is one of a winch, a headlight, and a radio.

3. The control system of claim 1, wherein the accessory is an audio device consisting of one of a horn, a radio and an entertainment system.

4. The control system of claim 3, wherein operation of the first lever causes a volume of the audio device to increase, whereas operation of the second lever causes the volume of the audio device to decrease.

5. The control system of claim 1, wherein the powertrain comprises a plurality of gears, and the actuator is operable to shift between the plurality of gears in the powertrain mode.

6. The control system of claim 1, further comprising a control circuit operably connected to the accessory for allowing an operator to operate the accessory independently of the actuator and the selector.

7. The control system of claim 6, further comprising a controller for controlling an aspect of the powertrain in the powertrain mode, and wherein the control circuit is operably connected to the accessory for allowing an operator to operate the accessory independently of the controller.

8. The control system of claim 7, wherein the selector circuit is connected to the accessory in parallel with the control circuit such that the accessory can be controlled by either the actuator through the selector circuit or a separate control mechanism through the control circuit.

9. The control system of claim 7, wherein the control circuit comprises an on-off mechanism to allow the operator to turn the accessory on and off.

10. The control system of claim 6, wherein the selector circuit is connected to the accessory in parallel with the control circuit such that the accessory can be controlled by either the actuator through the selector circuit or a separate control mechanism through the control circuit.

11. The control system of claim 6, wherein when the control circuit is operable to allow the operator to operate the accessory while the vehicle is in the powertrain mode.

12. The control system of claim 1, wherein the powertrain is operable in an automatic transmission mode and a manual transmission mode.

13. The control system of claim 1, further comprising a controller for controlling an aspect of the powertrain in the powertrain mode.

14. The control system of claim 1, wherein the vehicle is an off-road vehicle with a pair of seating surfaces arranged side-by-side, the seating surfaces being encompassed by a rollover protection system;
   wherein the accessory is one of a winch having a cable, a light, and an audio device;
   wherein the actuator comprises a pair of paddle shifters to enable actuation while one of the vehicle operator's hands grasps the steering wheel;
   wherein the powertrain comprises a plurality of gears, and the first lever and the second lever are operable to shift between the plurality of gears in the powertrain mode;
   wherein the selector is disposed on a dashboard of the vehicle, wherein the selector comprises a selector circuit having a pair of selector elements that move in unison;
   wherein the vehicle further comprises a control circuit for operation of the accessory independently of the first lever and the second lever;
   wherein when the vehicle is in the accessory mode and one of the first lever and the second lever is held in a retracted position, an operation of the accessory continues; and
   wherein the vehicle further comprises a controller for controlling an aspect of the powertrain in the powertrain mode.

15. A control system for a vehicle comprising:
   a powertrain for powering the vehicle;
   a plurality of accessories for use with the vehicle;
   an actuator configured to operate in a powertrain mode to control an aspect of the powertrain, and to operate in a plurality of accessory modes to control an aspect of the plurality of accessories, the actuator comprising a first lever on one side of a steering wheel, and a second lever on an opposite side of the steering wheel; and
   a selector configured to switch the actuator between the powertrain mode and the plurality of accessory modes;
   wherein when the vehicle is in one of the plurality of accessory modes, actuation of the first lever causes a first operation of one of the accessories, and actuation of the second lever causes a second operation of the one of the accessories, wherein the first operation and the second operation are different such that actuation of the first lever causes a different operation of the one of the accessories than actuation of the second lever.

16. The control system of claim 15, wherein the plurality of accessory modes comprises at least two from a group consisting of a winch mode, a light mode and an audio mode.

17. The control system of claim 16, wherein the light mode is a headlight mode, and wherein the audio mode is a radio mode.

18. A control system for a vehicle comprising:
   a powertrain for powering the vehicle;
   an accessory for use with the vehicle;
   an actuator configured to operate in a powertrain mode to control an aspect of the powertrain, and to operate in an accessory mode to control an aspect of the accessory, the actuator comprising a first lever on one side of a steering wheel, and a second lever on an opposite side of the steering wheel;
   a selector configured to switch the actuator between the powertrain mode and the accessory mode; and
   a control circuit comprising an on-off mechanism operably connected to the accessory for allowing an operator to turn the accessory on and off independently of the actuator and the selector;

wherein when the vehicle is in the accessory mode, actuation of the first lever causes a first operation of the accessory, and actuation of the second lever causes a second operation of the accessory, wherein the first operation and the second operation are different such that actuation of the first lever causes a different operation of the accessory than actuation of the second lever.

19. The control system of claim 18, wherein the control circuit is operably connected to the accessory for allowing the operator to turn the accessory on and off when the vehicle is in the powertrain mode and when the vehicle is in the accessory mode.

20. The control system of claim 18, wherein the selector circuit is connected to the accessory in parallel with the control circuit such that the accessory can be controlled by either the actuators through the selector circuit or a separate control mechanism through the control circuit.

* * * * *